March 7, 1933.    E. P. HUGHES    1,900,851
LIQUID LEVEL GAUGE
Filed July 5, 1929
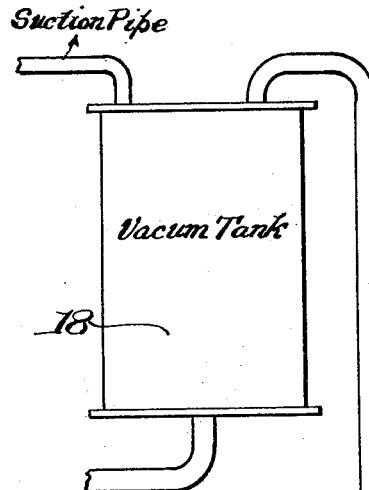
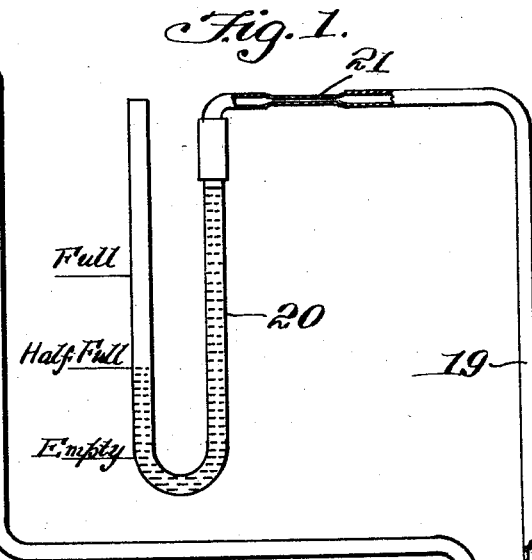
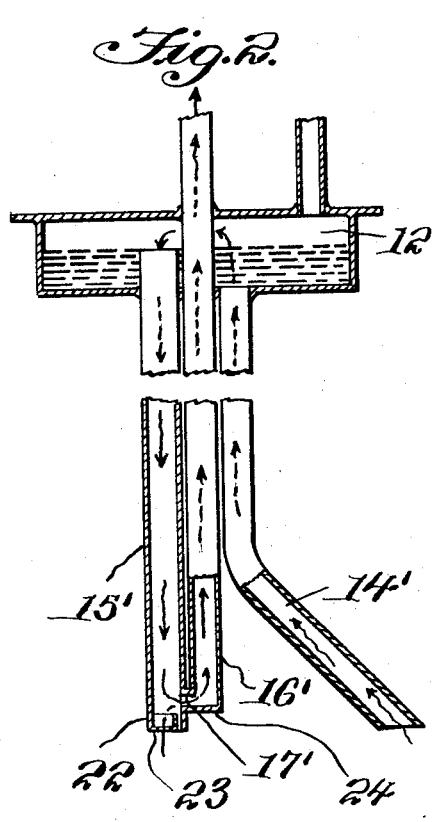
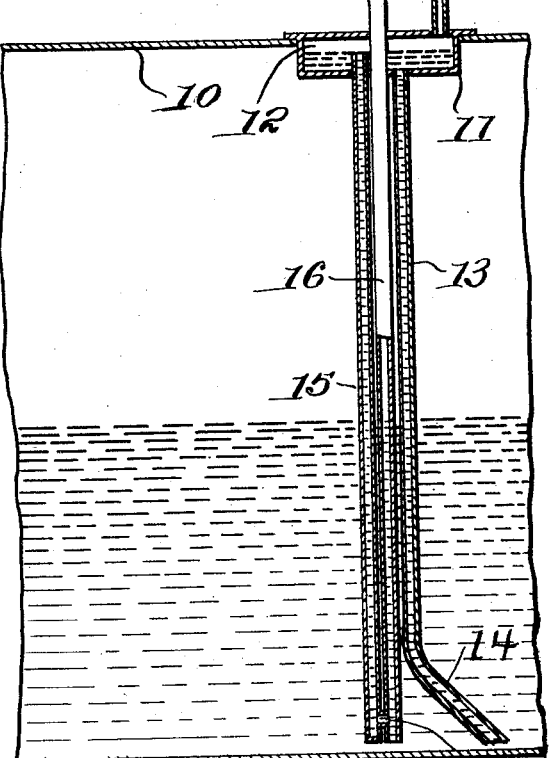
E. P. Hughes INVENTOR
BY Victor J. Evans ATTORNEY
WITNESS: G. T. L. Wright Patented Mar. 7, 1933

1,900,851

UNITED STATES PATENT OFFICE

EDWARD P. HUGHES, OF DETROIT, MICHIGAN, ASSIGNOR OF SIXTY PER CENT TO WALTER A. WOOD, OF DETROIT, MICHIGAN

LIQUID LEVEL GAUGE

Application filed July 5, 1929. Serial No. 376,107.

This invention relates to new and useful improvements in liquid level gauges.

An object of the invention comprehends the provision of a gauge element of the hydro-static type embodying the use of vacuum or lower than atmospheric pressure.

Another object of the invention embodies a submersible element having connection with the gauge element to vary the reading of the latter as the level of a liquid in a storage tank changes.

An additional object of the invention consists of a discharge tube for the submersible element to vary the suction on the gauge as the level in the storage tank drops.

With the above and other objects in view, the invention further consists of the following novel features and details of construction, to be hereinafter more fully described, illustrated in the accompanying drawing and pointed out in the appended claims.

In the drawing:—

Figure 1 is an elevation of my invention partly broken away and arranged for connection with the conventional form of vacuum tank, and Figure 2 is a fragmentary side elevation of a modified form of submersible element.

Referring to the drawing in detail wherein like characters of reference denote corresponding parts, the reference character 10 indicates generally a fuel tank for use upon automobiles, storage tanks for oil burners and etc., and which carries a housing member 11 closed upon all sides and forming a compartment 12 therein. A tube 13, having connection with the bottom of the housing and with the interior thereof for communication with the compartment 12, depends for an appreciable distance therebeyond to adjacent the bottom of the tank. The latter mentioned end of the tube is open and outwardly and obliquely disposed, as at 14, the purposes and advantages of such disposition will be presently apparent in the description of the invention to follow. A suction tube 15 having a closed lower end lies alongside the tube 13 and has its upper open end in communication with the housing 11 at a point appreciably above the bottom of the latter. The height of projection of the uppermost end of the suction tube 15 sets and determines the liquid level in the housing. A discharge tube or pipe line 16 passing through the top and bottom walls of the housing 11 is extended within the tank in spaced parallelism with the tubes 13 and 15 respectively. A connecting port, orifice, or passage 17 is formed in the adjacent side walls of the suction tube 15 and the discharge pipe 16. The discharge tube 16 is connected with a vacuum tank 18 in the ordinary manner, and its lower end is open to the tank 10.

The gauge element, as mentioned in the foregoing, comprises a tube 19 having connection with the upper wall of the housing 11, and which is connected at its opposite end with a U-shaped sight tube 20 suitably calibrated with indicia or legends whereby the contents of the fuel tank may be read upon the instrument panel of a motor vehicle. A portion of the tube 19 is pinched or otherwise reduced, as indicated at 21, to provide a restricted passage to regulate air flow between the level of liquid in the chamber 12 and the sight tube 20.

The means for obtaining and preserving a column of liquid at a fixed level in this gauge is by making use of velocity suction. When suction is applied to the discharge pipe or pipe line 16, incident to the action of the float within the vacuum tank 18, gasoline will flow therethrough from the fuel tank. The velocity of gasoline flowing or passing through the pipe line past the communicating passage 17 creates suction in the tube 15 and chamber 12 thereby causing gasoline to rise in tube 13 into the chamber 12. Any additional gasoline sucked up from the fuel tank into the chamber 12 and above the level of the uppermost projecting end of the suction tube 15 therein will be carried off by the latter until same reaches the passage 17. The amount of gasoline or other fuel passing through this opening passes on through the discharge tube or pipe line 16 to the vacuum tank. The gasoline has no tendency to run out of chamber 12 inasmuch as the gasoline in the suction tube 15 balances the gasoline in tube 13. The oblique disposition of the lowermost end of the tube 13 is for the purpose of locating its opening some distance from the adjacent end of the pipe line 16 whereby the velocity of gasoline entering the pipe line 16 will have very little or no suction effect on the lower opening of tube 13.

By fixing or predetermining a certain level for the gasoline within the compartment 12, same is subdivided into liquid and air compartments. The entrapped air in upper part of chamber 12 serves to maintain the columns of liquid in tubes 13, 15 above the level of liquid in tank 10 more nearly constant should the gauge, as a whole, be affected by expansion, contraction or a leak. The air column also prevents the gasoline from entering tube 19 and affecting the accuracy of the gauge.

The effective head of liquid in the tube 20 is always equal in weight to the head of liquid in the tube 13, suction tube 15 and chamber 12 above the surface of the liquid in the fuel tank. As the liquid level varies in the fuel tank the effective weights of liquid in tube 13, suction tube 15 and chamber 12 varies thereby causing the liquid to move in the sight tube. It should be remembered that liquid in tube 13 and suction tube 15 up to the surface of liquid in the storage tank have the same pressure as the liquid in the tank 10. The liquid in tubes 13 and 15 and chamber 12 above the level of liquid in tank 10 is held in place by lower than atmospheric pressure existing between the surface of liquid in chamber 12 and liquid in sight tube 20. The reduced portion 21 in the tube 19 provides a restricted passage which regulates air flow between the surface of liquid in chamber 12 and sight tube 20. The object of restricting the air flow between the sight tube 20 and chamber 12 is to prevent sucking the liquid out of the sight tube and to prevent erratic reading of the sight gauge.

The modification illustrated in Figure 2 of the drawing embodies all of the characteristics of operation and conforms closely to the construction of the preferred form with the following exceptions. The modification suggested itself in the adaptation of the invention for use upon and in conjunction with fuel pumps where the velocity suction through the feed pipe is considerably less than the suction created through the feed lines for vacuum tanks. The differentiating feature in the modification consists of a resistance element 22 seated upon a flange portion 23 within the lowermost end of a suction tube 15'. A portion of the flange supporting the resistance element is cut away whereby a restricted passage is established therebetween in communication with a discharge tube 16' through a communicating passage 17'. The lowermost end of the discharge tube 16' is closed, as at 24, in line with the lower wall of the communicating passage 17'. As will be noted, the lowermost end of the discharge tube 16 in Figure 1 of the drawing is open and extends the same distance within the fuel tank with relation to the suction tube 15. The resistance of element 22 is to be practically equal to the resistance through the tube 14', chamber 12' and suction tube 15'. After tubes 14' and 15', as well as the chamber 12' have been filled with gasoline they have some resistance to flow and the greater part of the gasoline will then flow past the orifice created between the resistance element 22 and the flange 23 of the suction pipe 15'.

The invention is susceptible of various changes in its form, proportions and minor details of construction, and the right is herein reserved to make such changes as properly fall within the scope of the appended claims.

Having thus described the invention, what is claimed is:—

1. A liquid level indicator comprising a closed housing, a pair of tubes suspended therefrom and in communication therewith at their upper ends, one of said tubes having its upper end disposed above the bottom of said housing and its lower end substantially closed, the other tube having its upper end disposed at the bottom of said housing and its lower end open, a discharge tube having its lower end in communication with the first named tube through a restricted passage and adapted for communication with a vessel in which said tubes may be submersed, means for drawing liquid upwardly through said discharge tube, and a pressure-responsive gauge means in communication with the top of said housing.

2. A liquid level indicator comprising a closed housing, a pair of tubes suspended therefrom and in communication therewith at their upper ends, one of said tubes having its upper end disposed above the bottom of said housing and its lower end substantially closed, the other tube having its upper end disposed at the bottom of said housing and its lower end open, a discharge tube having its lower end in communication with the first named tube through a restricted passage and adapted for communication with a vessel in which said tubes may be submersed, means for drawing liquid upwardly through said discharge tube, a pressure-responsive gauge means in communication with the top of said housing, and a resistance element operative on the lower or intake end of said first named tube.

3. A liquid level indicator comprising a closed housing, a pair of tubes suspended therefrom and in communication therewith at their upper ends, one of said tubes having its upper end disposed above the bottom of said housing and its lower end substantially closed, the other tube having its upper end disposed at the bottom of said housing and its lower end open, a discharge tube having its lower end in communication with the first named tube through a restricted passage and adapted for communication with a vessel in which said tubes may be submersed, means for drawing liquid upwardly through said discharge tube, and a U-tube gauge having a connection in communication with the top of said housing.

4. A liquid level indicator comprising a closed housing, a pair of tubes suspended therefrom and in communication therewith at their upper ends, one of said tubes having its upper end disposed above the bottom of said housing and its lower end substantially closed, the other tube having its upper end disposed at the bottom of said housing and its lower end open, a discharge tube having its lower end in communication with the first named tube through a restricted passage and adapted for communication with a vessel in which said tubes may be submersed, means for drawing liquid upwardly through said discharge tube, a pressure-responsive gauge, and a tube connecting said gauge to the top of said housing, said tube last named having a restricted portion.

In testimony whereof I affix my signature.

EDWARD P. HUGHES.